Nov. 24, 1964  M. B. COOK  3,158,271
SORTER
Filed March 2, 1960  7 Sheets-Sheet 1

INVENTOR.
Milton B. Cook
BY
  TW Secrest
    ATTORNEY

Nov. 24, 1964 M. B. COOK 3,158,271
SORTER
Filed March 2, 1960 7 Sheets-Sheet 2

INVENTOR.
Milton B. Cook
BY
T W Secrest
ATTORNEY

Nov. 24, 1964          M. B. COOK          3,158,271
                         SORTER
Filed March 2, 1960                  7 Sheets-Sheet 4

INVENTOR.
Milton B. Cook
BY
 TW Secrest

ATTORNEY

Nov. 24, 1964  M. B. COOK  3,158,271
SORTER
Filed March 2, 1960  7 Sheets-Sheet 5

INVENTOR.
Milton B. Cook
BY
TW Secrest

ATTORNEY

Nov. 24, 1964   M. B. COOK   3,158,271
SORTER
Filed March 2, 1960   7 Sheets-Sheet 6

INVENTOR.
Milton B. Cook
BY TW Secrest

ATTORNEY

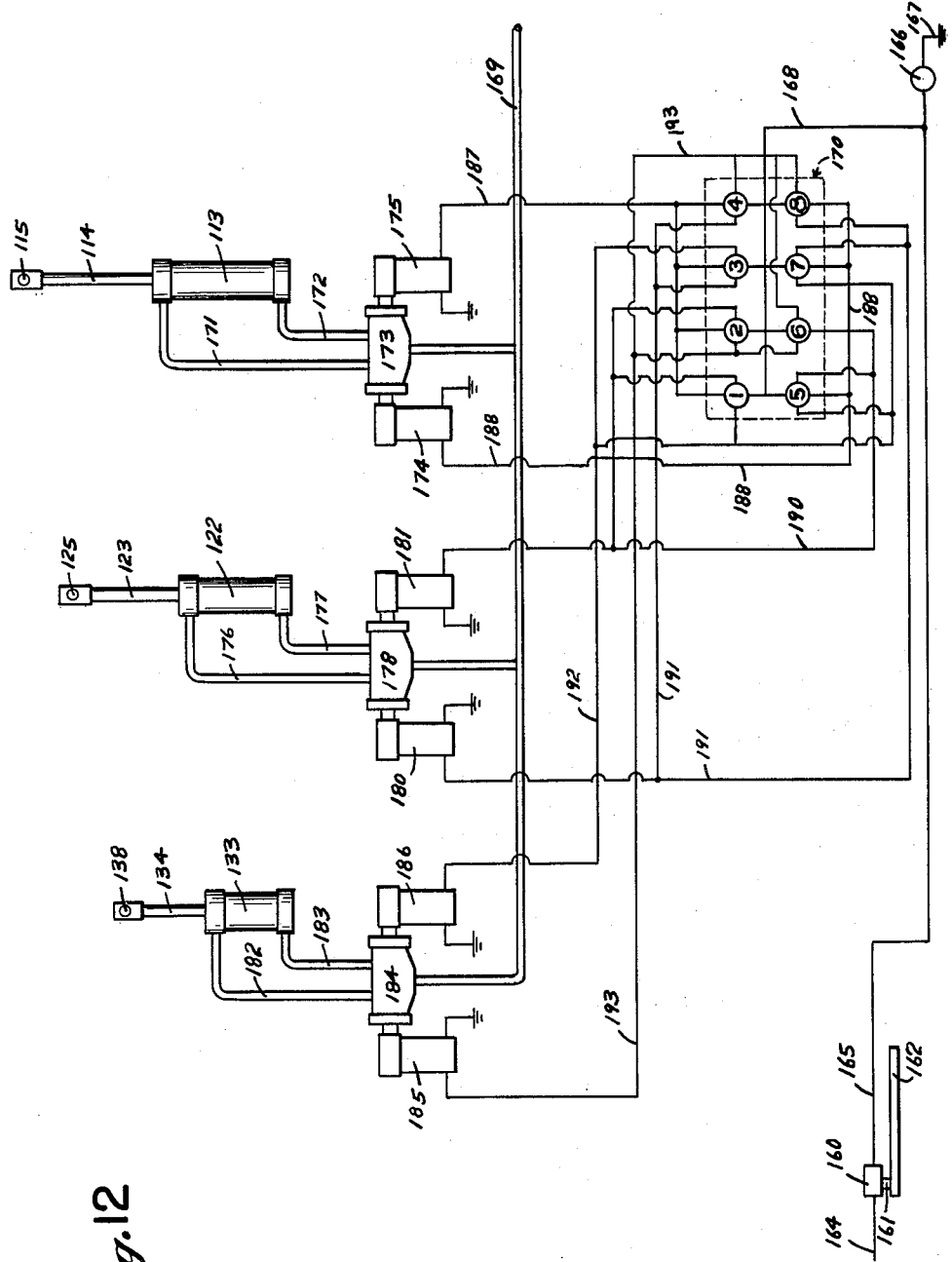

United States Patent Office 3,158,271
Patented Nov. 24, 1964

1

3,158,271
SORTER
Milton B. Cook, Seattle, Wash., assignor to Production Systems, Inc., Seattle, Wash., a corporation of Washington
Filed Mar. 2, 1960, Ser. No. 12,468
3 Claims. (Cl. 214—11)

This invention relates to a sorter and, more particularly, to a sorter for separating and grading various goods such as lumber, packages, nuclear materials packaged in containers and tree trunks preparatory to sawing.

In the lumber industry, lumber is sorted and graded prior to commercial distribution. A sorter, to realize wide commercial acceptance, should have a low maximum height so as to be capable of installation in existing structures. Many of the previously used sorters have had a high height which restricted their installation and usage.

The sorter of this application meets this requirement as it is of a low height. Other advantages of this sorter are its manner of construction and the basic simplicity of the component parts; readily controllable by a single operator; operates at a high performance rate; and, is economical to construct and operate.

These and other important advantages will be more clearly brought forth by the following specific disclosure of the sorter, the drawings and the claims.

In the drawings:

FIGURE 12 is a schematic control diagram illustrating the controls for the guide channels of the memory system.

Before specifically describing the sorter, a brief general description of the same will be presented. The sorter comprises a series of vertically, spaced-apart, downwardly sloping shelves or trays. A feeding mechanism or elevating device delivers the material being sorted to the trays or shelves. This mechanism comprises an ascending ramp or an incline. There is an overhead-endless chain in operating relationship with the ramp. Depending from this chain are dogs or lugs which push the material up the incline, or it can be considered that the endless chain or belt drags the material up the incline. Positioned between the ramp and the shelves are a series of vertically spaced-apart gates. These gates, in open position, lead downwardly from the ramp to the shelves. The gates are opened and closed by means of an operator and a memory system. The operator at his station decides which tray is to receive the material, viz., in the case of lumber this can be considered to be a sorting and a grading operation. The operator selects the appropriate tray to receive the material, and when the material reaches a certain position the gate is lowered so as to permit the material to move onto the appropriate shelf or tray.

Figure 2:
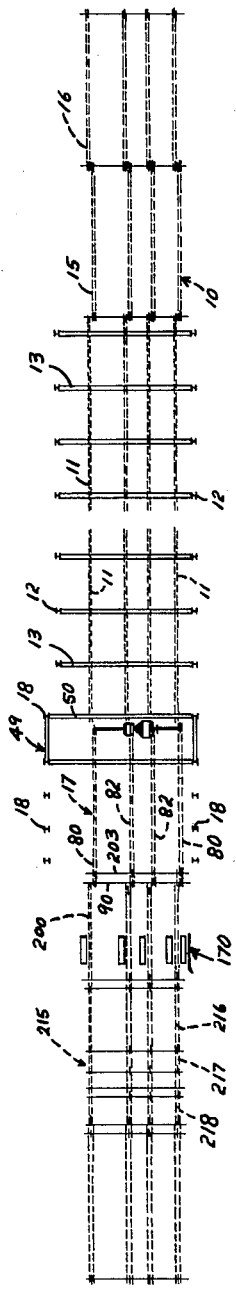
FIGURE 2 is a plan view of the sorter and the supporting structure therefor.
Figure 1:
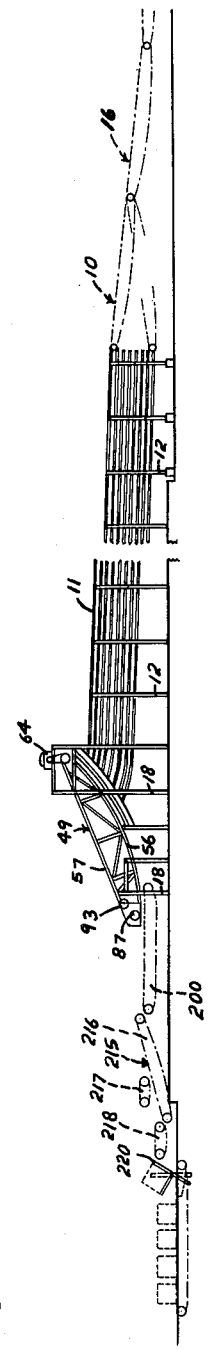
FIGURE 1 is a fragmentary side elevational view of a specific embodiment of the invention constructed in accordance with the preferred teachings thereof, and schematically illustrates, in phantom, supporting structure.
Figure 3:
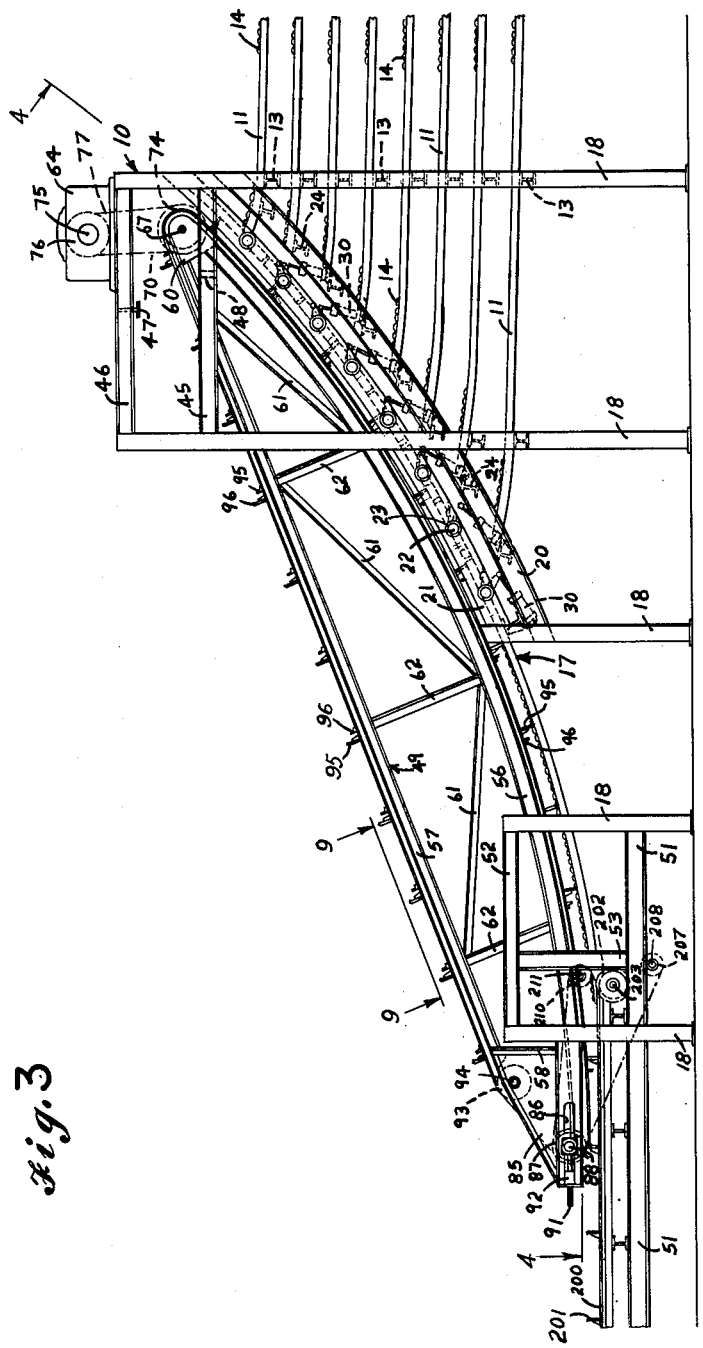
FIGURE 3 is a side elevational view of the elevating device or feeding mechanism employed for elevating a conveyed member to an appropriate height for loading onto a tray or shelf.

Referring to the drawings, and especially to FIGURES 1, 2 and 3, it is seen that reference numeral 10 represents the sorter. The sorter comprises a series of downwardly sloping shelves or trays 11. These shelves are supported by upright pedestals 12 and lateral cross-members or I-beams 13. For ease of moving the material on the shelves there may be rollers or wheels 14 projecting above the upper edge of the shelf. At the lower or unloading end of the shelves or trays is an unloading belt 15 (in phantom in FIGURES 1 and 2). As is seen in FIGURE 1 this belt is pivoted to rotate around the right end. The belt 15 feeds into another endless belt 16 for unloading purposes.

At the left of the bank of trays or shelves 11 is an inclined ramp or an ascending ramp 17. This ramp comprises a number of upright pedestals or supports 18. Bracing the three right supports 18 on each side are braces 20. A second set of braces 21, spaced slightly above the two braces 20, also connects these three right pedestals 18 on each side. Running between the two braces are a series of shafts 22. These shafts are journalled in bearings 23 in the braces.

Extending between the two braces 20 are lateral braces or I-beams 24.

Figure 4:
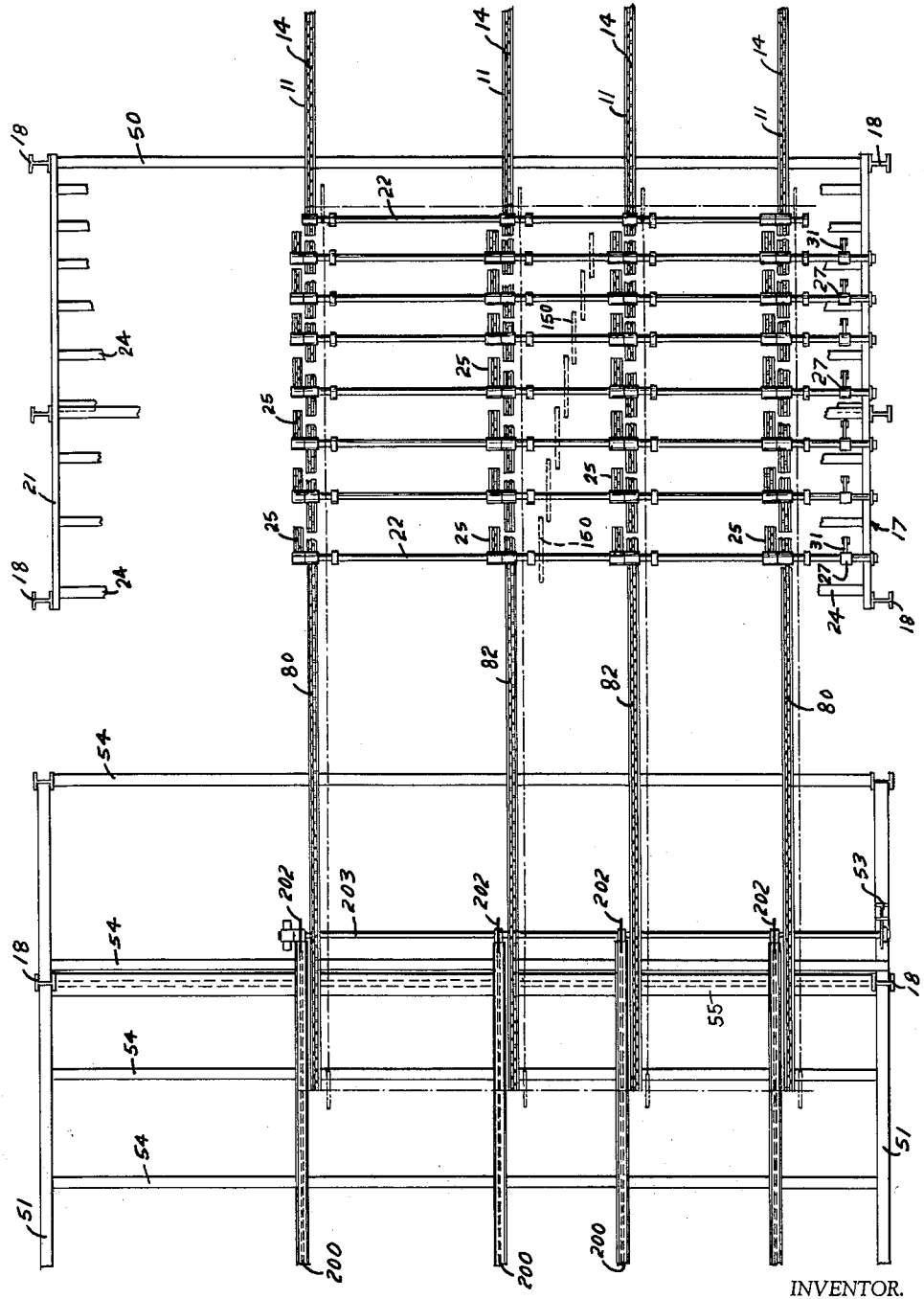
FIGURE 4 is a cross-sectional view showing the elevating device or feeding mechanism employed for elevating a conveyed member to an appropriate height and tray and taken on the line 4—4 of FIG. 3.
Figure 5:
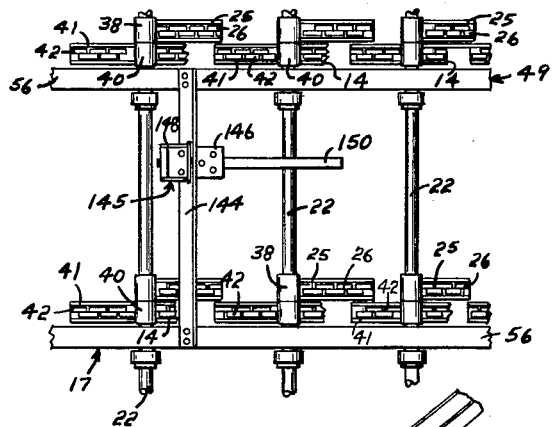
FIGURE 5 is a fragmentary plan view of the gates used in the elevating device for transferring lumber from the device to the tray.
Figure 6:
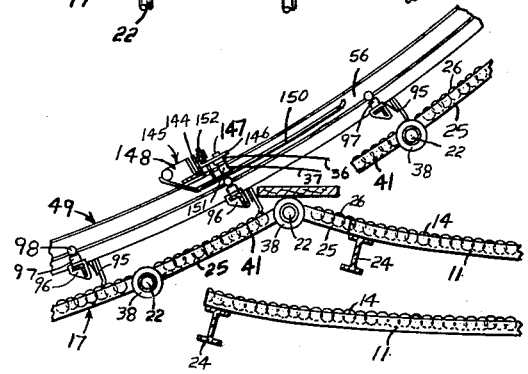
FIGURE 6 is a frgamentary side elevational view of the three gates with one of the gates lowered to allow lumber to move from the elevating device down to an appropriate tray.
Figure 7:
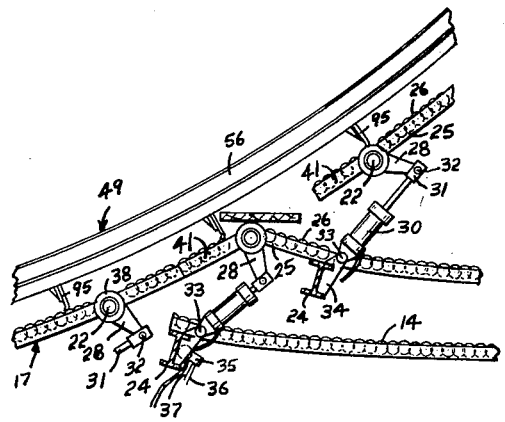
FIGURE 7 is a fragmentary side elevational view of three gates with one of the gates lowered to allow lumber to move from the elevating device to an appropriate tray, and shows the actuating mechanism for moving the gates.

In FIGURE 4 it is seen that there are four roller tracks 14 in each shelf. Associated with each of the tracks in each shelf, and on each of the shafts 22, is a gate 25. The gate is on a hub 38 which is keyed to the shaft 22. On the upper edge of each gate 25 is a set of rollers 26 as shown in FIGS. 5, 6 and 7. Keyed to the shaft 22 is a hub 27. Attached to this hub is an arm 28 which may be rotated by fluid actuated cylinder 30, the end 31 of the plunger rod thereof being connected to arm 28 by pin 32. The plunger is pinned at 32 to the arm 28. The lower end of the cylinder 30 is pinned at 33 to a lug 34. This lug is welded to the next lower cross-brace or I-beam 24. In operating relationship with each cylinder 30 is a solenoid valve 35 having lead-in wires 36 and 37, one such valve being shown in FIG. 7. The valve controls the air inlet for pneumatically operating the cylinder and plunger. The air pipes leading to the cylinder are generally illustrated in FIG. 7.

In the normal state, i.e., with the gates 25 closed, the plunger is extended. In the state where the gates are open the plunger is retracted. In open position it is seen that the gate slopes downwardly from the inclined ramp to the shelf or tray 14. Actually, the free or outer end of the gate 25 rests or is supported on the I-beam 24.

On the shaft 22 is another set of hubs 40, see FIGURE 5. Attached to these hubs and oriented in the longitudinal direction of travel of the material, are arms 41. Projecting above the upper edge of the arms 41 are rollers 42. These arms run downwardly from the hubs 40, viz., the arms are inclined upwardly toward the hubs 40. The hubs 40 are fixed to the adjacent I-beams 56 by suitable means (not shown).

In FIGURES 5, 6 and 7 the relationship between the shelves 14, the gates 25 and the arms 41 is presented. It is seen that the arms 41 and the gates 25, in closed position, comprise the ascending ramp or the incline. With a gate 25 lowered or open it is seen that the gate overlaps the upper part of the tray 14, and that the lumber moves down onto the tray.

The memory system for opening a particular gate will be described at a later period.

Figure 8:
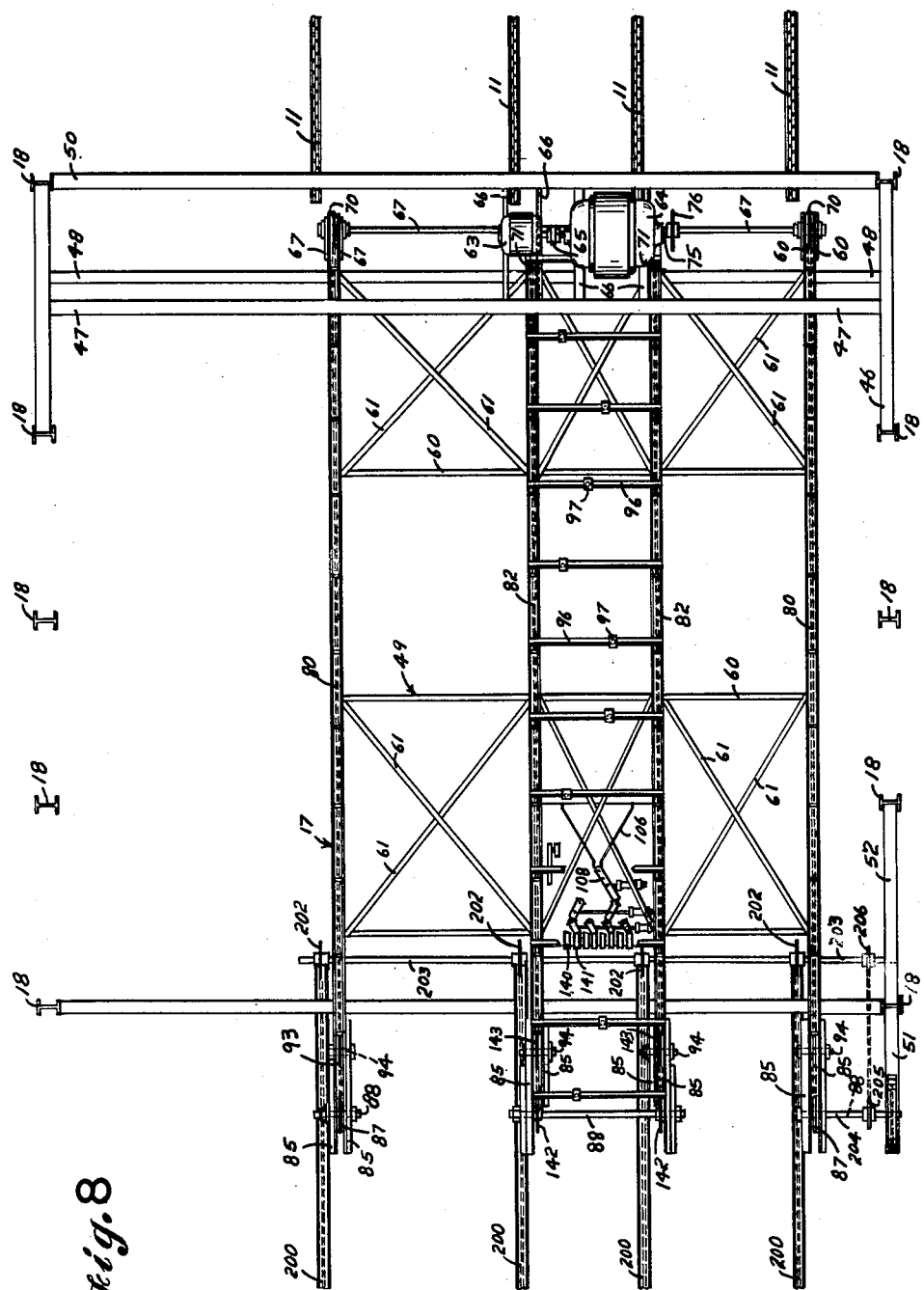
FIGURE 8 is a fragmentary plan view of the sorter and illustrates the position of the memory system and guide channels therein with respect to the rest of the sorter.

The feeding mechanism 49 for elevating the lumber up the ramp is an overhead mechanism. Referring to FIGURES 3 and 8 it is seen that the two right pedestals 18 are tied together on one side of the feeding mechanism by braces 45 and 46 to form a right-support assembly. In turn the right-support assemblies on each side of the feeding mechanism are tied together by lateral braces or stringers 47, 48 and 50.

The two left pedestals 18 on one side are tied together by the long longitudinal brace 51 and the short brace 52 to form a left-support assembly. An upright brace 53 connects 51 and 52. The longitudinal braces 51 are tied together by lateral cross-braces 54.

In addition to the cross-braces 54 in the left-support assembly there is a lateral brace or I-beam 55 between two of the pedestals 18. This brace is the left support for the feeding mechanism 49. The right support is the lateral brace 48 extending between the two braces 45.

This mechanism comprises spaced apart, upwardly curving lower I-beams 56 and upper I-beams 57. Connecting the left end of the I-beam 57 and the left end of the I-beam 56 is an upright brace 58. The lateral brace 55 and the upright brace 58 are joined as by welding into an integral unit so as to be the left support of the mechanism. The right support of the mechanism is by means of the lateral brace 48 connecting with the upper I-beam 57 as by welding or the like. The right ends of 56 and 57 are also joined by a plate 60.

In addition to these already described bracing members in the feeding mechanism there are the usual lateral braces 60, cross braces 61 and upright braces 62. In all, there are four sets of I-beams 56 and 57.

The drive for the feeding mechanism comprises a motor 63 and a variable speed-gear box 64. These are connected by coupling means 65. The motor and the gear box are supported on braces 66 which run between lateral braces 47 and 50.

Journalled in the plates 60 is a shaft 67. On this shaft are four drive sprockets, the two outer sprockets 70, the two inner sprockets 71 and a driven sprocket 74. The gear box 64 has an output shaft 75 and on which shaft is a sprocket 76. A chain 77 conects the sprocket 76 and the driven sprocket 74 on the shaft 67, see FIGURE 3.

The two outer sprockets 70 are associated with two outer chains 80. The two inner sprockets 71 are associated with the two inner chains 82. The outer chains are used for moving lumber up the ramp, and the inner chains are used with the memory system for opening the gates. Also, the two inner chains move the lumber up the ramp.

Attached to the left of the upright brace 58 and the left end of the I-beam 56 is a plate 85. In fact, there are two spaced-apart plates 85. In the plates 85 are slots 86. The two plates are spaced apart for receiving a sprocket 87. The sprocket is on a shaft 88 which is journalled in blocks 90. A rod 91 connects with the journal blocks 90. There is a nut 92 on the rod for ease of moving the blocks in order to regulate the tension on the chains 80 and 82. Between the two coacting plates 85, and near the upper edge, is a sprocket 93. This sprocket is on a shaft 94.

The outer chains 80 pass around sprockets 70, 93 and 87. Attached to these chains are outwardly directed lugs or fingers 95. As is seen in FIGURES 6 and 7 these lugs contact the lumber so as to push it up the ramp. The lugs on the two chains 80 are aligned so as to evenly move the lumber up the ramp.

It is to be understood that there are lugs 95 on the chains 82 for moving the lumber up the ramp.

Figure 9:
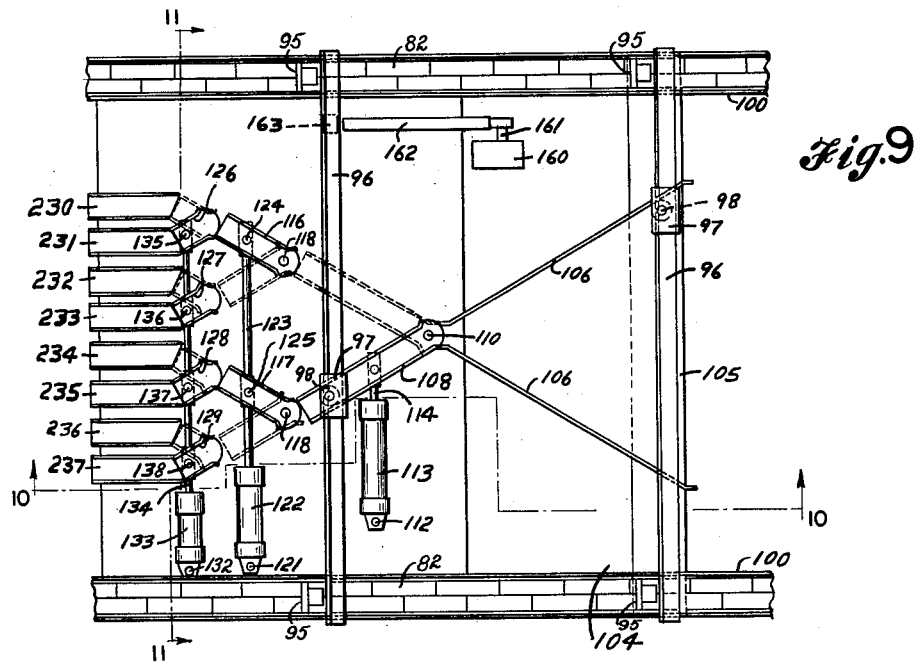
FIGURE 9 is a fragmentary plan view of the sorter taken on line 9—9 of FIG. 3 and illustrates the guide channels of the memory system.
Figure 10:
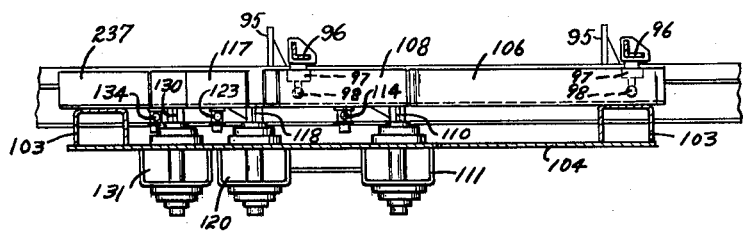
FIGURE 10 is a longitudinal cross-sectional, side-elevational view taken on line 10—10 of FIGURE 9, and illustrates the guide channels and the supporting structure.
Figure 11:
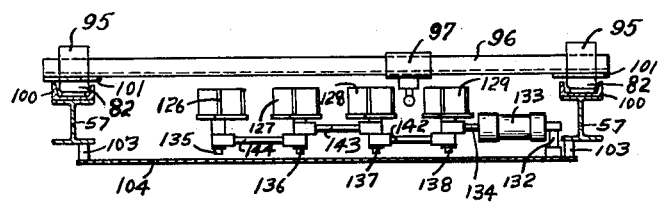
FIGURE 11 is a lateral cross-sectional, side-elevational view taken on line 11—11 of FIGURE 9, and illustrates the guide channels and the supporting structure.

Attached to the two inner chains 82 and on their outer edges are cross bars or support bars 96 (these may be angle iron as seen in FIGURES 9, 10 and 11). Attached to the bars 96 and projecting inwardly therefrom are a series of mounts 97. On the end of this mount is a guide follower or a cam follower 98. On the upperside of the two inner I-beams 57 is a guide channel 100. Attached to the inner face of and near each edge of the bar 96 is a mounting plate 101. Mounted on the underneath face of each of these plates is the chain 82. The chain 82 cofits with the channels 100 to align the bar 96. Two aligned sets of two spacers 103 each are mounted on the inside of I-beams 57. Mounted on these spacers is a mounting plate 104. This plate supports the bearing and guide channel structure to be presently described.

Running between the two I-beams 57 is a lateral support 105. Mounted on this support are two inwardly directed fence members 106. These members converge to form a funnel 107. The funnel 107 leads into a guide 108 which, in a lateral cross-section is of a U-configuration. The guide is pivoted at its inner end to a shaft 110 which is journalled in bearing 111. This bearing is positioned on the outer or underneath surface of the mounting plate 104. Pinned at 112 to the plate 104 is a fluid actuated cylinder 113 having a plunger 114. The plunger is pinned at 115 to funnel 108. As is readily appreciated the funnel can be rotated between the two positions illustrated in FIGURE 9 (the solid lines and the phantom lines).

The outlet of the guide 108 upon rotation leads into one of two shorter guides 116 and 117. Each of these shorter guides is pivoted at its inner end to a separate shaft 118. As the guides 116 and 117 and associated equipment are of identical structure the same reference numerals will be employed for like parts. Each of the shafts 118 is journalled in a bearing 120. These bearings are positioned on the underneath side of the mounting plate 104. Pinned at 121 to the plate 104 is a fluid-actuated cylinder 122 having a plunger 123. The plunger 123 is pinned at 124 and 125 to the guides 116 and 117. As is readily appreciated the guides 116 and 117 can be rotated between the positions illustrated in FIGURE 9 (the solid lines and the phantom lines).

The outlets of the guides 116 and 117 upon rotation lead into one of shorter guides 126, 127, 128 and 129. Each of these shorter guides is pivoted at its inner end to a separate shaft 130. As the guides 126, 127, 128 and 129 are of like structure the same reference numerals will be employed for like parts. Each of the shafts 130 is journalled in a bearing 131. These bearings are positioned on the mounting plate 104. Pinned at 132 to the plate 104 is a fluid-actuated cylinder 133 having a plunger 134. The plunger 134 is pinned at 138 to the guide 129. In the guide 128 is a pin 137. An arm 142 connects the pins 137 and 138. In the guide 127 is a pin 136. An arm 143 connects the pins 136 and 137. In the guide 126 is a pin 135. An arm 144 connects the pins 135 and 136. As is readily appreciated the guides 126, 127, 128 and 129 can be rotated between the positions illustrated in FIGURE 9 (the solid lines and the phantom lines).

Each of the rotatable guides 126, 127, 128 and 129 leads into a fixed guide, viz., 230, 231, 232, 233, 234, 235, 236 and 237.

In operation an operator determines the positions of the guide 108, the guides 116 and 117, and the guides 126, 127, 128 and 129 so as to position the cam follower 98 on the bar 96. As is seen in FIGURE 9, the mount 97 is directed by the fence 106 to the inlet of the guide 108. This guide directs the mount to the inlet of the guide 117. The guide 117, in turn, directs the mount to the guide 128. The guide 128 directs the mount 97 to the associated stationary guide 235. In this manner the mount is positioned on the bar 96.

The chains 82 connect with the cross bars 96 and carry said cross bars 96. These chains and their lugs 95 are actuated by and run over the structure like the structure employed with the chains 80. The sprocket 87 is now referred to by reference numeral 142, and the idler 93 is now referred to by reference numeral 143. As is already known the driving sprockets 70 on the drive shaft 67 are now drive sprockets 71 on shaft 67 for driving chains 82.

The actuation of the gates 25 is most readily explained upon reference to FIGURES 5, 6 and 7. In FIGURE 5 it is seen that between the two inner longitudinal I-beams 56 there is a lateral support 144. This support may be an angle iron. In fact, there is a series of these supports 144, one for each gate 25. The support is located down the ramp, with respect to the flow of material on the ramp, to the next upper gate 25. Or, the support is between two adjacent gates 25. Mounted on the support 144 is switch assembly 145. This assembly comprises an upwardly directed arm 146. This arm carries one contact 147 of the switch. There is also a downwardly directed support arm 148. This support arm carries an actuating arm 150 which depends down and then extends up the ramp underneath the support arm 144. In FIGURE 6 it is seen that the arm 150 is sufficiently long to run from below the gate 25 to above the gate 25. The arm 150 carries on its upper surface a second contact 151 of the switch. From this it is seen that when the cam follower 98 is in contact with the arm 150 that the two contacts 147 and 151 of the switch are closed. In order to assure proper spacing between the two contacts 147 and 151 there is provided a spacer rod 152 and which rod 152 passes through arm 146 and contacts the upper surface of the arm 150.

A lead wire 36 connects with contact 147 and a lead wire 37 connects with contact 151. It is to be recalled that the lead wires 36 and 37 connect with the solenoid valve 35 associated with the two-way pneumatic cylinder 30. Naturally, there is provided a suitable electric power source for driving this solenoid valve. It is seen that when the cam follower 98 is out of contact with the arm 150 the plunger 31 is extended so that the gate 25 is closed and the lumber continues to move up the ramp. With the cam follower 98 in contact with the arm 150 the two contacts 147 and 151 are moved together so as to close the switch. The plunger is thereby drawn into the cylinder 30 and the gate 25 is opened so that the lumber can move to the appropriate tray or shelf 14. Then, when the switch is opened the plunger 31 is extended and the gate 25 is closed.

As may be seen from FIG. 4, there are provided a plurality of switch arms 150, these being in staggered array across the space between the chains 82. Each of the switch arms 150 is in line with one of the fixed guides 230 to 237. Consequently, the operator having determined the position of the guides 108, 116, 117 and 126 to 129, has thereby determined the position of a mount 97 laterally of its bar 96 and this mount 97 will leave the memory system as the chains 82 move in their paths and will strike one or another of the switch arms 150. The switch arm 150 which is struck will open a corresponding gate 25. Thus it will be seen that by determining the positions of the guides and thereby the position of a mount 97, a selected one of the gates 25 is opened to receive a predetermined article, such as one of the pieces of lumber.

The wiring diagram illustrative of the controls for controlling the position of the mount 97 on the bar 96 is depicted in FIGURE 12. This switch comprises a shaft 161. Mounted on this shaft is an arm 162. On the underneath side of the bar 96 is a block or lug 163. This lug is positioned so that it rotates the arm 162 so as to close the switch 160. Lead wire 164 leads into the switch and lead wire 165 leads out of the switch. The wire 165 leads to a light 166 which is grounded at 167. A lead 168 interconnects the lead 165 and a control panel 170. On this control panel are switches 1, 2, 3, 4, 5, 6, 7 and 8. In effect, when the switch 160 is closed, it permits electricity to flow to the control panel 170 so as to actuate the valves controlling the cylinders 113, 122, and 134 for controlling the guides 108, 116, 117, 126, 127, 128 and 129. This arrangement prevents the operator from plugging two signals into the memory unit at the same time.

The fluid-actuated cylinders 113, 122 and 133 connect with a fluid-pressure pipe 169. The cylinder 113 connects by means of pipes 171 and 172 with valve 173. There are two solenoid operated valves 174 and 175 for controlling the valve and the position of the plunger 114. The cylinder 122 connects by means of pipes 176 and 177 to valve 178. There are two solenoid operated valves 180 and 181 for controlling the valve 178 and the position of the plunger 123. The cylinder 133 connects by means of pipes 182 and 183 with valve 184. There are two solenoid operated valves 185 and 186 for controlling the valve 184 and the position of the plunger 134. The valves 174, 175, 180, 181, 185 and 186 are grounded.

With the solenoid valves 174, 180 and 185 actuated, the respective plungers 114, 123 and 134 are extended. With the solenoid valves 175, 181 and 186 actuated, the respective plungers 114, 123 and 134 are restricted.

Lead 187 connects with the valve 175 and lead 188 connects with the valve 174. Lead 190 connects with the valve 181 and lead 191 connects with the valve 180. Lead 192 connects with the valve 186 and lead 193 connects with the valve 115. The switches 1 through 8 connect with the appropriate valves through these leads.

The switches 1, 2, 3 and 4 have the same setting for the valves 174 and 175. These switches connect with the valve 175 through the lead 187, viz., the plunger 114 is retracted. The switches 1 and 2 have the same setting for the valves 180 and 181. These switches connect with the valve 181 through the lead 190. The switch 1 connects with the valve 186 through the lead 192 so that the stationary guide 237 is the final guide through which the cam follower 98 passes. The plungers 114, 123 and 134 are all retracted. The switch 2 connects with the valve 185 by means of the lead 193. The plungers 114 and 123 are retracted while the plunger 134 is extended so that the guide 236 is the final guide through which the cam follower 98 passes.

The switches 3 and 4 have the same setting for the valves 180 and 181. These switches connect with the valve 180 through the lead 191. The switch 3 connects with the valve 186 through the lead 192. With switch 3 actuated the plungers 114 and 134 are retracted and the plunger 123 is extended so that the stationary guide 235 is the last guide through which the cam follower 98 passes. The switch 4 connects with the valve 185 through the lead 193. The plunger 114 is retracted and the plungers 123 and 134 are extended so that the guide channel 234 is the last guide channel through which the cam follower 98 passes.

The switches 5, 6, 7 and 8 have the same setting for the valve 174 and the valve 175. These switches connect with the valve 174 through the lead 188, viz., the plunger 114 is extended. The switches 5 and 6 connect with the valve 181 through the lead 190. The switch 5 connects with the valve 186 through the lead 192. With the switch 5 actuated the plunger 114 is extended and the plungers 123 and 134 are retracted so that the stationary guide 233 is the last guide through which the cam follower 98 passes. The switch 6 connects with the valve 185 through the lead 193. The plungers 114 and 134 are extended and the plunger 123 is retracted so that the guide 232 is the last guide through which the cam follower 98 passes.

The switches 7 and 8 have the same setting for the valve 180 and 181. These switches connect with the valve 180 through the lead 191. The switch 7 connects with the valve 186 through the lead 192. With the switch 7 actuated the plungers 114 and 123 are extended and the plunger 134 is retracted so that the stationary guide 231 is the last guide through which the cam follower 98 passes. The switch 8 conects with the valve 185 through the lead 193. The plungers 114, 123 and 134 are extended so that the guide 230 is the last guide through which the cam follower 98 passes.

It is seen from the circuit diagram that when the switch 160 is closed the light 166 is on so as to indicate to the operator that the various guide channels 108, 116, 117, 126, 127, 128 and 129 can be positioned for positioning the mount 97 on the bar 96.

Leading to the ramp and the selective part of the memory system are endless chains or belts 200 for delivering the material to the ramp. These chains have outwardly directed lugs 201 for moving the lumber. These chains run around the spockets 202 on the shaft 203. With reference to FIGURE 8 it is seen that the shaft 203 is journalled in supporting structure 51 and 53.

The shaft 203 is driven by the chain 80 through suitable sprockets and a chain. In FIGURE 8 it is seen that the lower sprocket 87 is mounted on one of the shafts 88 (in phantom, now referred to by reference numeral 204). On the shaft 204 is a sprocket 205. On the shaft 203 is a sprocket 206. Now, below and to the right of the shaft 203 is an idler sprocket 207 on the shaft 208. And, positioned above and to the right of the shaft 203 is an idler sprocket 210 on the shaft 211. The shaft 211 may be journalled in bearings positioned on braces 58 and 56. A chain 212 runs around the left of the sprocket 205; under and around the right of the sprocket 207; to the left of the sprocket 202; up and around the right of the sprocket 210; and to the upper part of the sprocket 205. It is seen that the two idlers 207 and 210 make it possible for the chains 200 to move in the same direction as the chains 80 and 82.

Referring to FIGURES 1 and 2 it is seen that it is a staging area 215 for moving the lumber and other material to the endless-delivery chain 200. This staging area comprises a series of endless chains 216 as depicted in FIGURE 2. There is a series of four chains for elevating the lumber to the endless chain 200. Also, there are auxiliary endless chains 217 and 218 associated with the chain 215. Also, there is tilting table 220 for handling the various materials.

In operation, a plurality of articles are fed onto the conveyor 200, as shown at the left side of FIGS. 1 and 2. These articles comprise, for example, pieces of lumber of differing grades. As a particular article comes into a predetermined zone within view of the operator at control panel 170, he decides upon its classification or grade, and knowing which shelf or tray 11 is to receive that particular piece of lumber, he selects and pushes one of the switches 1 to 8 of FIG. 12. By means of the circuit and cylinders 113, 122 and 133, the guides (see FIG. 9) 108, 116, 117 and 126 to 129 are set to a predetermined combination of positions. This will cause one of the mounts 97 to be positioned by the guides; for example, the mount 97 shown in guide 108 will exit through guide 235. As shown in FIGS. 3 and 4, continued movement of conveyor 200 and chains 80 and 82 will result in the transferring of the particular article from conveyor 200 to ramp 17, the article being moved up ramp 17 by the lugs on chains 80 and 82. The particular mount 97 will be adjacent the particular article, as shown in FIG. 6, and as the chains 80 and 82 advance, carrying along the article and the mount 97, the latter will engage that one of switch arms 150 (see FIG. 4) with which it is aligned. A circuit will thereby be closed through a particular one of the solenoid valves 35 to cause a particular one of the gates 25 to open to admit the particular article to a predetermined and preselected one of the shelves or trays 11.

The control panel 170 may be located at an advantageous position such as near the endless belt or chain 200. In this position the operator is in a good position to grade the lumber or sort the material preparatory to moving onto the ramp. Also, the switches or buttons 1 through 8 of the control panel 170 may be adapted for foot or hand actuation.

From the above description, and the drawings, it is seen that this sorter is capable of handling lumber, logs preparatory to sawing, containers for radio-active material and packages. It is to be understood that many of the standard components are schematically illustrated in the drawings. It is considered that, at the present time, it is not necessary to illustrate well-known auxiliary apparatus associated with the more important components, viz., with the cylinder 30 it is not necessary to show the pneumatic or hydraulic lines connecting with this two-way cylinder. Also, it is considered that the journalling of every shaft is superfluous as today it is known that shafts are journalled.

Having presented my invention, what I claim is:

1. A sorter, said sorter comprising a series of shelves and a memory system, said shelves being vertically spaced, a feeder mechanism for feeding the material being sorted to said shelves, said mechanism comprising an ascending ramp leading to the shelves, a first means to move the material upwardly on the ramp toward the shelves, a second means for bridging the gap between the ramp and the shelves so as to allow the material to move from the ramp and onto the shelves, said memory system comprising a guide channel, said channel being movable between plural positions, a third means to move said channel to a predetermined position, a movable support, said support moving adjacent said channel and across the path of said channel, a lug, said lug being capable of moving on said support, upon movement of the support across the guide channel said channel acting upon said lug to move the same to a predetermined position on the support, and a fourth means associated with the second means so that with said lug actuating the fourth means the second means is actuated to allow the material to move from the ramp to the shelves.

2. A sorter, said sorter comprising a series of downwardly sloping shelves, said shelves being vertically spaced, a feeder mechanism for feeding the material being sorted to said shelves, said mechanism comprising an ascending ramp leading to the shelves, a first means to move the material upwardly on the ramp toward the shelves, said first means comprising an overhead endless belt, spaced-apart bars depending from the belt for moving upwardly on the ramp the material undergoing sorting said ascending ramp having a section, said section being pivoted at its lower end for swinging downwardly and away from the endless belt and toward the adjacent shelf so as to permit the material ascending the ramp to move to the downward sloping shelf, a memory system, said system comprising a first guide channel, said first guide channel being pivoted so as to be rotatable, a fence guide leading into the throat of said first guide channel, a second means to move said first guide channel to a predetermined position, a second guide channel, said second guide channel being pivoted so as to be rotatable, a third means to move said second guide channel to a predetermined position, said first guide channel leading into the throat of the second guide channel, a traveling support, said traveling support moving over and across the paths of said fence guide, said first and second guide channels, a movable lug on said support, said lug depending from said support, with said support moving over the fence guide, said fence guide directing the movable lug to the throat of the first guide channel, with said support moving over the first guide channel, said first guide channel directing the movable lug to the throat of the second guide channel, with said support moving over the second guide channel said second guide channel directing the movable lug to a position on the traveling support, a fourth means associated with said section to initiate movement of said section, and said lug in its predetermined position on the traveling support moving into an actuating position with respect to the fourth means so as to initiate the movement of the section to the lowered state to allow said material to move from the ramp to the shelf.

3. A memory system, said system comprising a first guide channel, said first guide channel being pivoted so as to be rotatable, a fence guide leading into the throat of said first guide channel, means to move said first guide channel to a predetermined position, a second guide channel, said second guide channel being pivoted so as to be rotatable, means to move said second guide channel to a predetermined position, said first guide channel leading into the throat of the second guide channel, a traveling support, said traveling support moving over and across the paths of said fence guide, said first and second guide channels, a movable lug on said support, said lug depending from said support, with said support moving over the fence guide, said fence guide directing the movable lug to the throat of the first guide channels, with said support moving over the first guide channel, said first guide channel directing the movable lug to the throat of the second guide channel, and with said support moving over the second guide channel, said second guide channel directing the movable lug to a position on the traveling support.

References Cited in the file of this patent
UNITED STATES PATENTS

| | | |
|---|---|---|
| 235,128 | Cook | Dec. 7, 1880 |
| 1,333,193 | Trew | Mar. 9, 1920 |
| 1,425,387 | Kitzmiller | Aug. 8, 1922 |
| 1,626,359 | Rundell | Apr. 26, 1927 |
| 1,808,135 | Gotthardt | June 2, 1931 |
| 1,832,517 | Werner | Nov. 17, 1931 |
| 2,613,825 | Setzer et al. | Oct. 14, 1952 |
| 2,760,621 | Crescenzo | Aug. 28, 1956 |
| 2,891,467 | Keilig | June 23, 1959 |